Jan. 29, 1952     E. L. BOYCE ET AL     2,583,543
LAWN MOWER

Filed Jan. 4, 1946     4 Sheets-Sheet 2

Inventors
Eugene L. Boyce
Harry Goldberg
by Parker & Carter
Attorneys

Jan. 29, 1952     E. L. BOYCE ET AL     2,583,543
LAWN MOWER
Filed Jan. 4, 1946     4 Sheets-Sheet 3
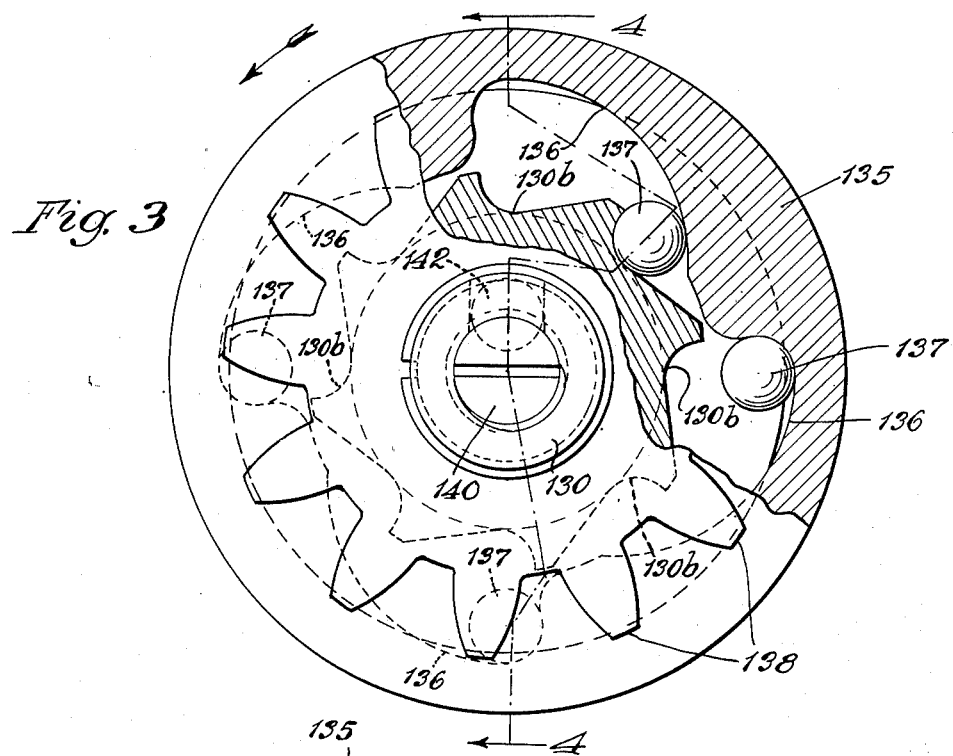
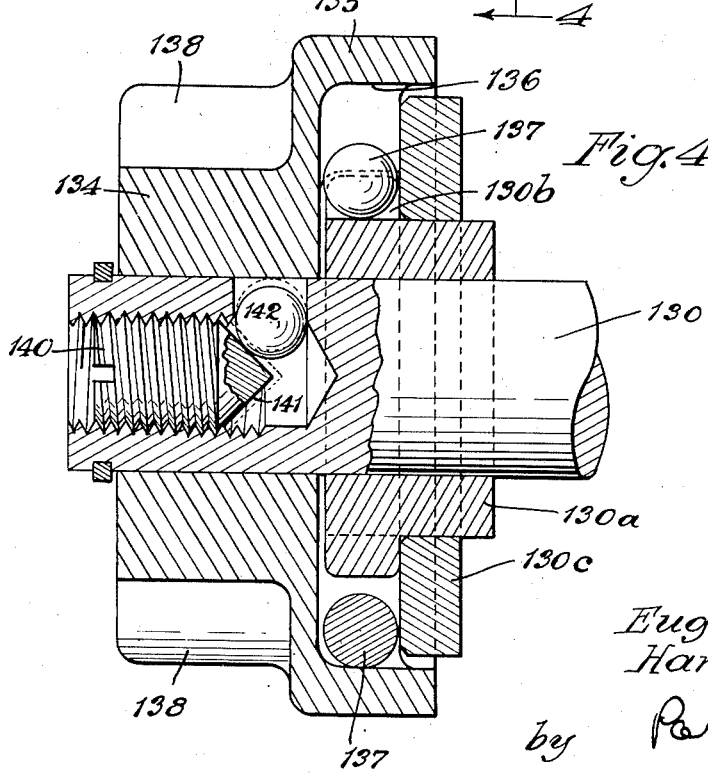
Inventors
Eugene L. Boyce
Harry Goldberg
by Parker Carter
Attorneys

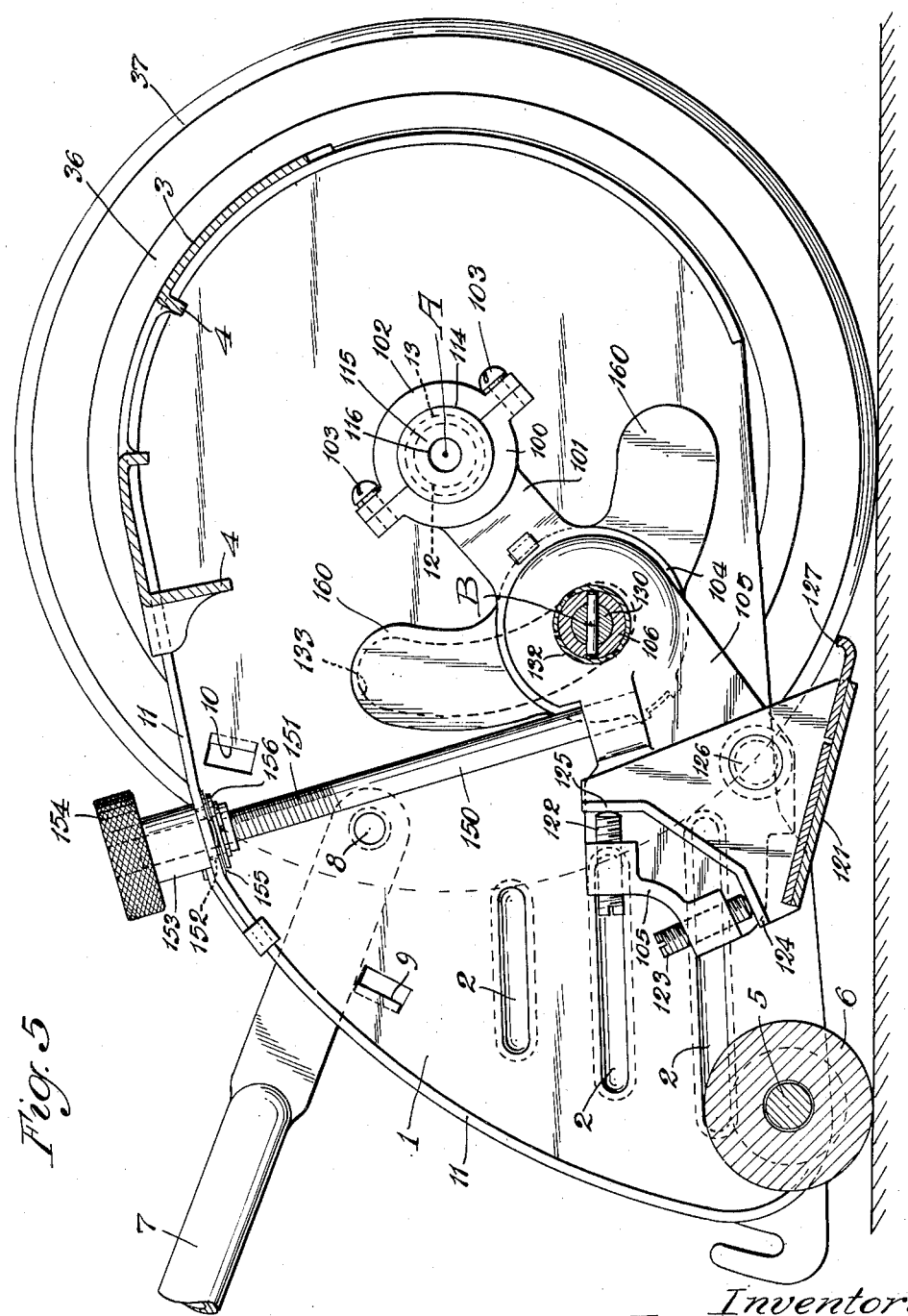

Patented Jan. 29, 1952

2,583,543

UNITED STATES PATENT OFFICE 2,583,543

LAWN MOWER

Eugene L. Boyce and Harry Goldberg, Chicago, Ill., assignors, by mesne assignments, to Pioneer Gen-E-Motor Corporation, Chicago, Ill., a corporation of Delaware Application January 4, 1946, Serial No. 639,009

9 Claims. (Cl. 56—249)

1

The invention relates to an improvement in lawn mowers and has for one purpose to provide an improved reversing means for imparting reverse rotation to the reel, in order to sharpen its blades.

Another purpose is to provide an improved lawn mower frame.

Another purpose is to provide improved means for lubricating the supporting wheels of a lawn mower.

Another purpose is to provide improved means for adjusting the reel assembly and cutter bar assembly of a lawn mower in relation to the ground level.

Another purpose is to provide an improved unitary removable reel and cutter bar structure.

Other purposes will appear from time to time in the course of the specification and claims.

We illustrate the invention more or less diagrammatically in the accompanying drawings, wherein:

Figure 3 is an elevation, on an enlarged scale, with parts broken away, illustrating a clutch structure;

Figure 4 is a section on the line 4—4 of Figure 3;

Figure 5 is a section, on a reduced scale, on the line 5—5 of Figure 2.

Like parts are indicated by like symbols throughout the specification and drawings.

Figure 1:
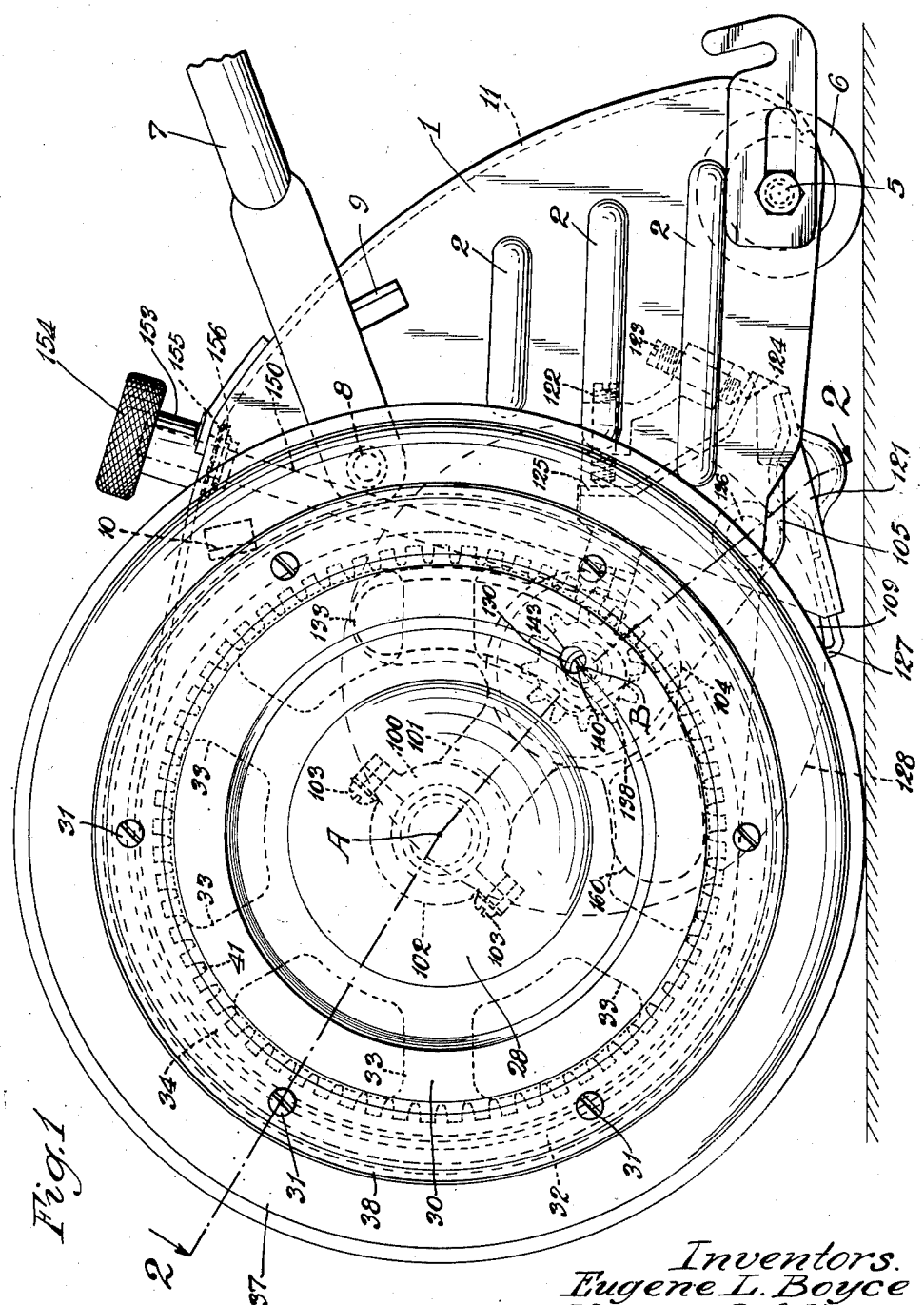
Figure 1 is a side elevation with parts indicated in dotted line.
Figure 2:
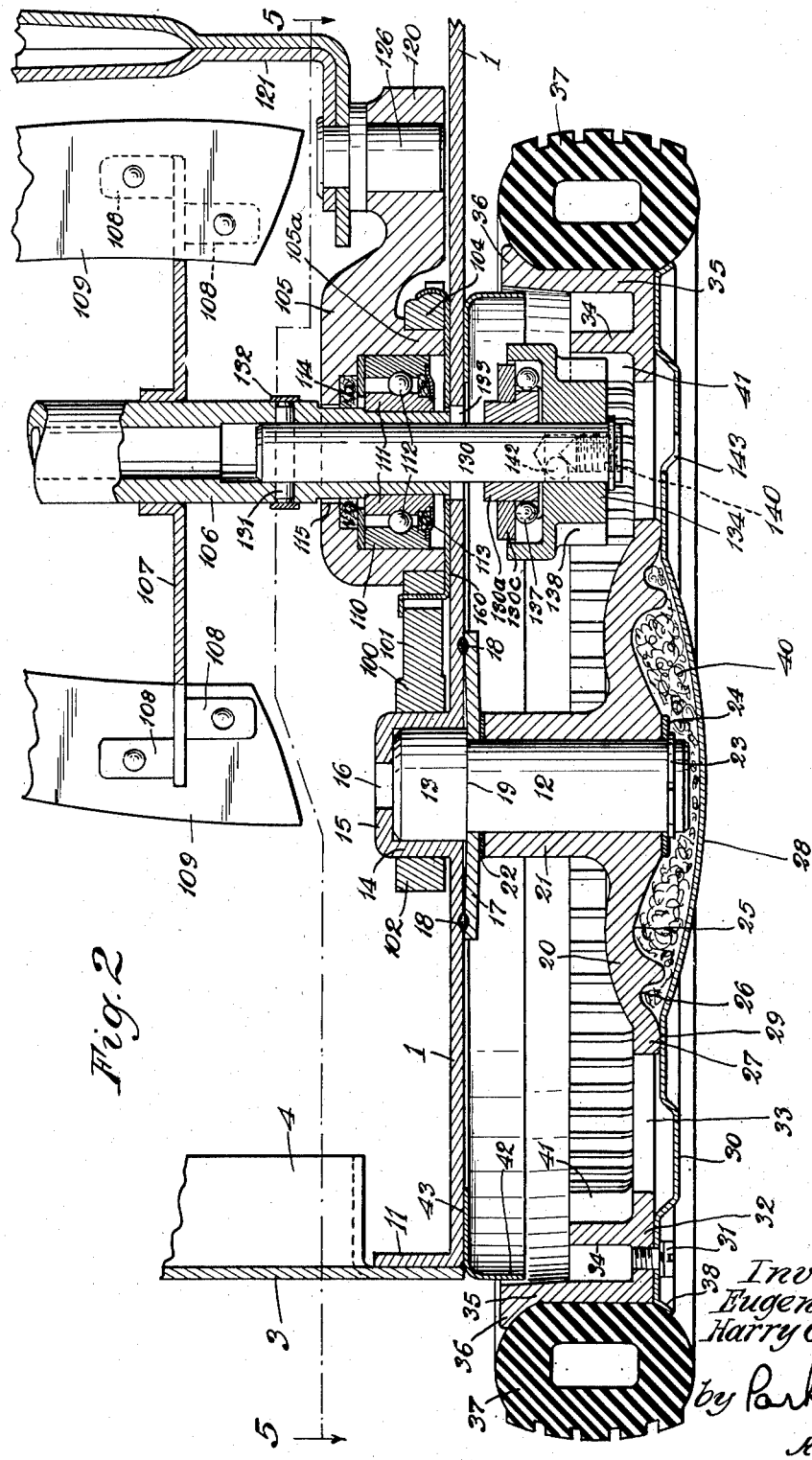
Figure 2 is a section, on an enlarged scale, on the line 2—2 of Figure 1.

Referring to the drawings, 1 indicates an end plate which forms part of the chassis of the lawn mower, there being one such plate at each end of the chassis. The rearwardly extending portion of each plate 1 may be strengthened, for example, by longitudinally extending offset integral ribs 2. The upper portions of the plates may be connected by a transversely extending frame portion 3, which may be of sheet metal, suitably strengthened by angular flanges 4. The rear ends of side plates 1 may be connected by any suitable transverse shaft 5, rotatable upon which we may employ one or more supporting rollers 6. A handle bail 7 is pivoted to the side frame members as at 8. Its arc of movement may be limited by any suitable stops or lugs 9, 10. The side end plates may have reinforcing angularly extending flanges 11. Mounted upon the exterior of each side or end plate 1 is a supporting and driving wheel. We illustrate, for example, a supporting stub shaft 12 which may have

2 an inner enlarged head 13 received in an integral sleeve 14 which may, if desired, be inwardly upset from the side plate 1. The inner end of the sleeve is partially closed by an end portion 15 which may have a central aperture 16. The shaft is held in position by the apertured spring plate 17 which may be spot welded or otherwise secured, as at 18, to the exterior face of the side plate 1, and which bears against the slightly outwardly extending face 19 of the head 13, which is outwardly offset from the plane of the outer face of the side plate 1. The stub shaft 12 is thus held firmly in position in relation to the side plate, from which it outwardly projects.

Rotatable on each such stub shaft is a ground engaging wheel. In the particular wheel structure herein illustrated, we employ a hub body 20 having an integral tubular bearing sleeve 21 which surrounds the shaft 12 and is rotatable thereabout. 22 illustrates any suitable bearing ring positioned between the members 17 and 21. The hub may be kept in position, for example, by any suitable snap ring or securing member 23, with its appropriate washer 24. The hub structure 20 has outwardly open generally concentric concavities 25 and 26. It terminates in a peripheral portion 27. Engaging the peripheral portion 27, and spanning and spaced outwardly from the concavities 25 and 26 of the hub is the cover plate 28. It engages the member 27 as at 29. It has an outwardly extending portion 30 which may be secured, by any suitable securing members 31, to the rim portion 32 of the wheel. The rim 32 is connected by spokes or other suitable members 33 to the hub 20. It includes an inner flange 34 and an outer flange 35. The outer flange 35 terminates in an extended tire gripping abutment 36 against which any suitable tire 37 may be forced by the exterior edge portion 38 of the closure plate 28. Thus the closure plate 28 is effective both to hold the tire 37 in position and to define, with the hub 20, a space in which any suitable lubricating material, such as oil soaked waste 40 may be positioned. This waste is effective to lubricate the opposed bearing surfaces of the shaft 12 and the sleeve 21.

It will be noted that the inner wheel flange 34 is provided with inwardly extended gear teeth 41, the purpose of which will later appear. The space within the rim 35 is partly closed by a protector cup in the form of a flange 42 having a portion 43 which may be welded or otherwise secured to the outer face of the side wall 1.

Rotatable about the exterior and preferably cylindrical surface of the member 14 is the supporting ring generally indicated as 100, shown as including a semi-circular portion at the end of a connecting member 101. The member 100 may be in the form of a split ring with a mating portion 102 secured to it, for example, by any suitable screws 103, to provide a sleeve surrounding the exterior of the member 14. The fixed portion 100 constitutes a fork which may be withdrawn from the member 14 when its removable component 102 is released. The member 101 terminates at its opposite end in a bearing ring 104. Rotatable within this ring is the reel support generally indicated at 105. 106 is the reel shaft upon which may be positioned any suitable spiders 107 having laterally extending flanges 108, to which the cutter blades 109 may be secured. The shaft 106 terminates adjacent or just short of the side plates 1 and is rotatable in the member 105, in any suitable bearings. We illustrate, for example, a bearing assembly having an outer race 110 and an inner race 111, with balls or rollers 112, positioned between them. Any suitable sealing means 113 and 114 may be employed. It will be noted that the member 105 is provided with an aperture 115, giving sufficient clearance to prevent wearing of the shaft 106 against the member 105, the roller bearing structure constituting the sole supporting connection for the shaft 106. The member 105 has an outwardly extending portion 120 to which any suitable cutter bar structure 121 may be adjustably pivoted. The details of such adjustment may be widely varied, but we illustrate set screws 122 and 123 as opposed to portions 124 and 125 of the cutter bar. Thus the cutter bar may be rotated into any desired position of adjustment about the axis of its pins 126, to position the edge portion 127 of the cutter bar in relation to the peripheral path 128 of the edges of the cutter blades 109.

In order to rotate the cutter shaft 106, we provide removable driving shafts 130 which may extend into one or both ends of the shaft 106 and may be held in position by cross pins 131, held against unintended movement by spring rings 132. The shaft portions 130 pass through arcuate slots 133 in the side plates 1. Adjacent the outer end of each said shaft or pin 130 is a fixed clutch hub 130a provided with a plurality of ball engaging notches 130b. 130c is a closure ring. Rotatable on the shaft 130 is the opposite clutch hub 134 with the surrounding ring or housing portion 135, also provided with ball engaging notches 136. A practical contour for the opposing clutch members is shown in Figure 3, the balls being indicated at 137. It will be understood that when the parts are in full line position of Figure 4, the hub 134 is rotatable about the member 130. It has, however, gear teeth 138, which mesh with the internal ring gear teeth 41. Thus, in response to the rotation of the ground engaging wheels caused by a forward movement of the mower chassis, the hub 134 is rotated and, through the balls 137, drives the shaft 130 in the proper direction to cause a cutting movement of the blades 109 across the edge 127 of the cutter bar 121. In order to provide ready means for reversing the direction of rotation of the reel, as when the blades 109 are to be sharpened, we provide locking screws 140 coaxial with, and extending into the ends of shafts 130. Each has an inner conic end 141 which is opposed to a locking ball 142. When the parts are in the full line position of Figure 4, the ball 142 is free, and performs no function. But when the screw 140 is rotated to advance it to the dotted line position, it urges the ball 142 into a locking engagement with the hub 134 and thus forces the hub 134 to rotate in unison with shaft 130. Thus the reel can then be rotated in a reverse direction, in response to backward movement of the mower, in order to sharpen the edges of the blades 109 by their reverse passage across the cutter bar edge 127. To provide ready access to the screw 140 we may provide an aperture 143 in the cover plate 40, through which a screw driver or other appropriate tool may be inserted.

An important feature of our invention is the provision of a reel assembly, and an associated cutter bar assembly which are unitarily adjustable and/or unitarily removable from the chassis. With reference, for example, to Figure 5, it will be evident that the member 100 is rotatable about the axis of rotation of the ground engaging wheels, as indicated at A. The axis of rotation of the reel, and of the reel shaft 106, is indicated at B. The end members 105 of the cutter shaft assembly, when raised or lowered, raise or lower the members 100 about the axis A. This causes a relative rotation of the reel assembly end members 100 and the cutter bar assembly end members 105, about the axis B. However, since we provide means for raising and lowering the members 105 while maintaining them at substantially constant angle to the ground, there is substantially no actual rotation of the members 105, although the members 100 rotate about the axis A and rotate, in relation to the members 105, about the axis B. While we may provide any suitable means for raising and lowering the members 105, we find it advantageous to employ adjusting members 150, in the form of rods which may be integral with or fixedly secured to the members 105. The rods may be screw threaded at their upper ends as at 151 and extend upwardly through a portion of the side frame flanges 11, which are provided with any suitable notches or apertures 152, as shown in Figure 5. Nut 153, with any suitable actuating portion 154, may thrust against the upper surface of flange 11, and is in screw threaded engagement with the threads 151 of the adjusting pins 150. We may also employ any suitable spring washer 155 compressed between the lower surface of the flange 11 and any suitable spacer sleeve structure 156. The parts are so proportioned that the necessary, but very slight, swinging movement of the pins 150 in relation to the flange 11, as the members 105 are raised or lowered, will not cause any cramping or binding action.

In order to mask the arcuate slots 133 in the side plates 1, we may employ a shield structure 160 mounted on or moving with the outer ends of the members 100, and of sufficient size to mask or protect the slots 133 at all normal positions of adjustment. It will be observed that the members 154 are readily engageable by the hand of the user, and that the reel and cutter bar assembly can easily be raised or lowered, to any desired adjustment, by rotation of the members 154. If the user wishes to remove the reel and cutter bar assembly, he can do so as follows: The members 154 are rotated until the pins 150 are released. The screws 103 are unscrewed, permitting removal of the member 102, and leaving the fork portions of the members 100 freely removable from the bearing members 14. The wheels may be removed by removing the closure plate 40 and releasing the split ring 23. The shafts 130 are removed by removing the snap rings 132 and the pins 131. The shafts 130 can then be readily removed from the ends of the reel shaft 106. There is then nothing left to hold the associated reel and cutter bar assemblies in the chassis and they can be freely withdrawn from between the side plates 1. As a matter of convenience it may be better to remove the wheels and the shafts 130, and also the member 102, before releasing the pins 150 from the nuts 153.

It will be realized that whereas we have described and claimed a practical and operative device, nevertheless, many changes may be made in size, shape, number and disposition of parts without departing from the spirit of the invention. We, therefore, wish our description and drawings to be taken as in a broad sense illustrative or diagrammatical rather than as limiting us to the particular showing of the present description and drawings. For example, shafts 130 may be used at both ends of the shaft 106, or at one end only.

The use and operation of the invention are as follows:

We show a chassis including a pair of side plates 1 connected by any suitable transverse supports, such as the frame portion 3 and the shaft 5. It is to be understood, however, that the details of the chassis structure may be widely varied. Mounted for adjustment between the end members, we employ a reel assembly including the end members 100 and a cutter bar assembly including the end members 105. The end members 101, which terminate in a fork, normally closed by the members 102, may rotate about the bearings 14, which define for the reel assembly an axis concentric with the axis of the supporting wheels, and indicated at A in Figures 1 and 5. The cutter bar assembly and the reel assembly are in an articulated relationship defined by axis B which is coaxial with the axis of rotation of the shaft 106 of the reel. The cutter bar is adjusted at the desired angle, by actuation of the set screws 122 and 123. Thus the relationship of its edge 127 to the path of movement of the cutting edges of the blades 109 is determined. By raising or lowering the pins 150, the cutter bar is bodily raised and lowered in relation to the surface over which the mower drives. This bodily adjustment is obtained with a negligible change in angle of the cutter bar. But as the cutter bar assembly is raised or lowered the reel assembly is thereby rotated about the axis A, and with no necessity for separate adjustment. The reel and cutter bar assembly are not merely unitarily adjustable, they are unitarily removable, from the chassis. In considering the details of the cutter reel assembly and the cutter bar assembly, the cutter shaft 106 is pivoted to the reel assembly by the bearing assemblies including the inner races 111, the outer races 110 and the balls 112. The outer races 110 are actually seated in cavities in the cutter bar assembly end members 105, but the upper portions of the members 105 are surrounded, as at 105a, by the bearing ring portion 104 of the reel assembly end members 100. Thus the end members of the two assemblies are relatively rotatable about the cutter reel axis, as indicated at B in Figure 5.

In sharpening the blades the reel is rotated in a reverse direction, and a suitable abrasive may be positioned on the cutter bar edge 127. The result would be a quick and efficient sharpening of the blades.

We claim:

1. In a lawn mower, a frame, a chassis including a pair of spaced end members and connections therebetween, ground engaging wheels mounted on said frame end members for rotation about a common and generally horizontal axis, a reel assembly and a cutter bar assembly, said assemblies being unitarily adjustable and removable from said chassis, each said assembly including end members, the end members of the reel assembly being rotatable about an axis concentric with the axis of rotation of said ground engaging wheels, and being rotatable in relation to the end members of said cutter bar assembly, a cutter reel and shaft rotatable about an axis concentric with the connections between the end members of the reel assembly and the cutter bar assembly, a driving connection between said shaft and said ground engaging wheels, effective at all positions of said reel assembly, and means for raising and lowering said reel and cutter bar assemblies including supporting members fixed to and extending upwardly from the end members of said cutter bar assembly.

2. In a lawn mower, a frame, a chassis including a pair of spaced end members and connections therebetween, ground engaging wheels mounted on said frame end members for rotation about a common and generally horizontal axis, a reel assembly and a cutter bar assembly, said assemblies being unitarily adjustable and removable from said chassis, each said assembly including end members, the end members of the reel assembly being rotatable about an axis concentric with the axis of rotation of said ground engaging wheels, and being rotatably in relation to the end members of said cutter bar assembly, a cutter reel and shaft rotatable about an axis concentric with the connections between the end members of the reel assembly and the cutter bar assembly, a driving connection between said shaft and said ground engaging wheels, effective at all positions of said reel assembly, and means for raising and lowering said reel and cutter bar assemblies including supporting members fixed to and extending upwardly from the end members of said cutter bar assembly, and means on said frame end members for imparting upward and downward movement to said supporting members.

3. In a lawn mower, a frame, a chassis including a pair of spaced end members and connections therebetween, ground engaging wheels mounted on said frame end members for rotation about a common and generally horizontal axis, a reel assembly and a cutter bar assembly, said assemblies being unitarily adjustable and removable from said chassis, each said assembly including end members, the end members of the reel assembly being rotatable about an axis concentric with the axis of rotation of said ground engaging wheels, and being rotatable in relation to the end members of said cutter bar assembly, a cutter reel and shaft rotatable about an axis concentric with the connections between the end members of the reel assembly and the cutter bar assembly, a driving connection between said shaft and said ground engaging wheels, effective at all positions of said reel assembly, and means for raising and lowering said reel and cutter bar assemblies including supporting members fixed to and extending upwardly from the end members of said cutter bar assembly, and externally positioned actuating members in threaded relation with said supporting members and adapted when rotated, to raise or lower said supporting members and said assemblies.

4. In a lawn mower, a frame, a chassis including a pair of spaced end members and connections therebetween, ground engaging wheels mounted on said frame end members for rotation about a common and generally horizontal axis, a reel assembly and a cutter bar assembly, said assemblies being unitarily adjustable and removable from said chassis, each said assembly including end members, the end members of the reel assembly being rotatable about an axis concentric with the axis of rotation of said ground engaging wheels, and being rotatable in relation to the end members of said cutter bar assembly, a cutter reel and shaft rotatable about an axis concentric with the connections between the end members of the reel assembly and the cutter bar assembly, a driving connection between said shaft and said ground engaging wheels, effective at all positions of said reel assembly, and means for raising and lowering said reel and cutter bar assemblies including supporting members fixed to and extending upwardly from the end members of said cutter bar assembly, means for raising and lowering said supporting members, and a supporting connection between each said supporting member and one of the frame end members, adapted to permit a limited tilting movement of each supporting member as it is moved up or down.

5. In a lawn mower, a frame, a chassis including a pair of spaced end members and connections therebetween, ground engaging wheels mounted on said frame end members for rotation about a common and generally horizontal axis, a reel assembly and a cutter bar assembly, said assemblies being unitarily adjustable and removable from said chassis, each said assembly including end members, the end members of the reel assembly being rotatable about an axis concentric with the axis of rotation of said ground engaging wheels, and being rotatable in relation to the end members of said cutter bar assembly, a cutter reel and shaft rotatable about an axis concentric with the connections between the end members of the reel assembly and the cutter bar assembly, a driving connection between said shaft and said ground engaging wheels, effective at all positions of said reel assembly, and means for raising and lowering said reel and cutter bar assemblies including supporting members fixed to and extending upwardly from the end members of said cutter bar assembly, means for raising and lowering said supporting members, and a supporting connection between each said supporting member and one of the frame end members, adapted to permit a limited tilting movement of each supporting member as it is moved up or down, each supporting member extending upwardly from one of the cutter bar assembly end members at a point adjacent the axis of rotation of the cutter shaft.

6. In a lawn mower, a chassis including end members and connections therebetween, ground engaging wheels mounted on said end members, and associated reel and cutter bar assemblies removably and adjustably mounted on said end members, including a pair of supports, a cutter reel and shaft rotatably mounted on the inner ends of said supports, a cutter bar adjustably mounted on the outer ends of said supports, and links connecting said supports and said end members, said links being pivoted to said supports concentrically with said reel, and being pivoted to said end members concentrically with said ground engaging wheels, and a direct supporting and adjusting connection between an upper part of the chassis, and each of said supports each including a tension member extending downwardly from the chassis, each support being suspended upon one of said tension members.

7. In a wheel supporting structure for a lawn mower chassis, a chassis end plate having an outwardly open socket, a headed stub shaft with the head seated in said socket, and an outer retaining ring apertured to permit the extension therethrough of the stub shaft, said ring being secured to the outer surface of the side plate and being formed and adapted to engage and grip the outer surface of the head of the stub shaft.

8. In a lawn mower, a chassis including end members and connections therebetween, ground engaging wheels rotatably mounted on said end members, end supports adjustably suspended from an upper portion of the chassis, a cutter reel rotatably mounted on said supports, a cutter bar adjustably mounted on said supports, and connections between said supports and the chassis end members including links pivoted to said end members concentrically with said ground engaging wheels and pivoted to said supports concentrically with said cutter reel.

9. The structure of claim 8 characterized by and including hanger rods extending from said end supports, and exterior rotatable operating handles therefor, located upon an upper portion of the chassis.

EUGENE L. BOYCE.
HARRY GOLDBERG.

REFERENCES CITED

The following references are of record in the file of this patent:

UNITED STATES PATENTS

| Number | Name | Date |
|---|---|---|
| 359,550 | Williams | Mar. 15, 1887 |
| 848,551 | Hill | Mar. 26, 1907 |
| 1,412,583 | Vannette | Apr. 11, 1922 |
| 1,826,663 | Hessenbruch | Oct. 6, 1931 |
| 2,124,956 | Roemer | July 26, 1938 |
| 2,138,786 | Funk | Nov. 29, 1938 |
| 2,199,919 | Limbach | May 7, 1940 |
| 2,269,920 | Seaver | Jan. 13, 1942 |
| 2,340,849 | Wildeboor et al. | Feb. 8, 1944 |
| 2,388,165 | Loewe et al. | Apr. 30, 1945 |

FOREIGN PATENTS

| Number | Country | Date |
|---|---|---|
| 24,660 | Great Britain | Nov. 3, 1906 |